(12) United States Patent
Mas Cano et al.

(10) Patent No.: US 11,649,124 B2
(45) Date of Patent: May 16, 2023

(54) DEVICE FOR FEEDING PRODUCT IN SHEETS INTO AN INSERTION DEVICE BEFORE A DIGITAL PRINTER

(71) Applicant: European Machinery Engineering Projects, S.L., Alicante (ES)

(72) Inventors: Eduardo Mas Cano, Alicante (ES); Santiago Mira Verdú, Alicante (ES)

(73) Assignee: European Machinery Engineering Projects, S.L., Alicante (ES)

( * ) Notice: Subject to any disclaimer, the term of this patent is extended or adjusted under 35 U.S.C. 154(b) by 431 days.

(21) Appl. No.: 15/931,980

(22) Filed: May 14, 2020

(65) Prior Publication Data

US 2020/0361729 A1 Nov. 19, 2020

(30) Foreign Application Priority Data

May 17, 2019 (ES) .............................. ES201930833U (51) Int. Cl.
| | |
|---|---|
| *B65H 3/32* | (2006.01) |
| *B65H 5/02* | (2006.01) |
| *B65G 59/06* | (2006.01) |
| *B65G 47/51* | (2006.01) |
| *B65G 47/244* | (2006.01) |

(52) U.S. Cl.
CPC ............. *B65H 3/32* (2013.01); *B65G 47/244* (2013.01); *B65G 47/514* (2013.01); *B65G 59/066* (2013.01); *B65H 5/021* (2013.01)

(58) Field of Classification Search
CPC ................ B65G 47/244; B65G 47/514; B65G 59/066; B65H 2301/4226; B65H 2301/4228; B65H 2301/42266; B65H 3/042; B65H 29/66; B65H 33/06; B65H 5/24; B65H 3/32; B65H 5/021
See application file for complete search history.

(56) References Cited

U.S. PATENT DOCUMENTS

| | | | | |
|---|---|---|---|---|
| 3,776,544 A | * | 12/1973 | Watson ................... | B65B 35/04 271/157 |
| 3,870,167 A | * | 3/1975 | Werner .................. | B65H 3/322 414/796 |
| 4,119,219 A | * | 10/1978 | Marschke ............ | B65G 59/023 271/37 |
| 4,993,915 A | * | 2/1991 | Berger ................. | B65G 59/026 414/792.9 |
| 5,135,351 A | * | 8/1992 | Rathert .................. | B42C 19/08 414/789.5 |

(Continued)

FOREIGN PATENT DOCUMENTS

WO 2017203074 A1 11/2017

*Primary Examiner* — Gregory W Adams
(74) *Attorney, Agent, or Firm* — The Webb Law Firm (57) ABSTRACT

The invention relates to a device for feeding products in sheets into an insertion device before a digital printer, including a lifting system for a stack of laminar elements, which in turn includes an extraction mechanism for the last board, an insertion system with an advance mechanism, a rotation system for the stack(s), a positioning stop, connected to an advance and reverse mechanism, a squaring and scaling station, able to create a loading and accumulating hopper, and a telescopically-adjustable transportation system, with the capacity to move the previously-scaled sheets until the insertion device is fed.

6 Claims, 8 Drawing Sheets

(56) References Cited

U.S. PATENT DOCUMENTS

| | | | | |
|---|---|---|---|---|
| 5,205,704 A * | 4/1993 | Frost | ............... | B65H 29/66 |
| | | | | 271/238 |
| 5,222,720 A * | 6/1993 | Newsome | ............... | B65H 83/02 |
| | | | | 271/166 |
| 5,240,102 A * | 8/1993 | Lucas | ............... | B65G 17/24 |
| | | | | 198/782 |
| 5,293,984 A * | 3/1994 | Lucas | ............... | B65G 13/071 |
| | | | | 198/414 |
| 6,230,872 B1 * | 5/2001 | Huang | ............... | B07C 3/08 |
| | | | | 198/368 |
| 6,595,740 B1 * | 7/2003 | Drake | ............... | B65H 1/00 |
| | | | | 271/157 |
| 7,631,744 B2 * | 12/2009 | Brommer | ............... | B42C 19/08 |
| | | | | 198/370.09 |
| 8,418,834 B2 * | 4/2013 | Sardella | ............... | B65H 3/242 |
| | | | | 414/796.4 |
| 8,939,274 B1 * | 1/2015 | Ross, Jr. | ............... | B65H 1/025 |
| | | | | 198/460.3 |
| 9,221,622 B2 * | 12/2015 | Morency | ............... | B65G 47/8861 |

* cited by examiner

DEVICE FOR FEEDING PRODUCT IN SHEETS INTO AN INSERTION DEVICE BEFORE A DIGITAL PRINTER

CROSS-REFERENCE TO RELATED APPLICATIONS

This application claims priority to Spanish Utility Model Application No. U201930833 filed May 17, 2019, the disclosure of which is hereby incorporated by reference in its entirety.

BACKGROUND OF THE INVENTION

Field of the Invention

The present invention relates to a device with which the feeding of laminar product (cardboard, cellular polypropylene, etc.) is carried out in an insertion device or feeder station before a digital printer, wherein the laminar product is longitudinally aligned, with the consequent time and space savings.

The final purpose of the invention is the development of a laminar product feeding device, which may or may not be previously rotated (90, 180 or 270 degrees) in order to feed an insertion device or station and which has the function of supplying correctly-aligned sheets, generally the length of the board with respect to the forward direction of the machine for a digital printer.

This device also has the feature of longitudinal alignment with the insertion device/station before the digital printer, which exists in current feeder devices for the flexographic industry, to thus prevent modifications in the flow of raw material in existing installations of final customers and the modification of the current plant thereof.

Description of Related Art

Laminar product feeder machines for an insertion device/feeder station of a digital printer are very common in the sector of flexographic printing of cardboard. These machines are used to automate the different production lines, supplying sheets to an insertion device wherein, for example, the unitary feeding of these sheets is to be carried out in a printing station or a case erector.

Furthermore, they also have the function of squaring the sheets, i.e., supplying them positioned with respect to a certain reference. To do so, the machines must not only be able to feed the insertion device, but, moreover, the sheets must be fed aligned in the same position, i.e., squared and with a uniform order among them.

The type of alignment of the feeder machines with respect to the inserter in the flexographic sector is almost always longitudinal, since it is always fed on the wider side of the sheet or board, perpendicular to the forward movement of the line, this being the more efficient and less bulky manner for the different production lines.

Another intrinsic feature of production plants in the sector of corrugated cardboard is that most of the processes thereof (corrugator outlets, transfers, belts, production machines, etc.) are carried out by directing the work flow of the raw material along the wider side of the sheet, in order to increase efficiency.

In the current state of the art, except for minor exceptions with specific features, sheet feeder machines for an insertion device/station before a graphic printer can generally be differentiated into two types depending on the graphic printing machine to which it is aligned. The first type would be flexographic printers, a system wherein the product is fed by the longer side thereof and in a unitary manner, also called "simple feeding", i.e., only one sheet per machine cycle. The second system would be digital printers, wherein the product is generally feed along the shorter side, given that since it is a non-cyclical system, the only limitation on printing is the width of the digital printer. This system further enables "double feeding" which consists of feeding two boards in parallel at the same time.

This differentiation with regard to the side to be handled is fundamental, since the machine feeding method and/or the volumes of the laminar material are completely different in terms of shape and handling.

For this reason, despite the fact that the different graphic industries wherein the same laminar product is used seem to be very similar in the final handling process, the feeding method of these two sectors in particular, the flexographic and digital sector, are completely different, the same group of machines not being able to be used without structural variation.

With the feeders that currently exist for the digital sector, this causes a high economic cost in terms of the space required for the location, which often creates significant problems, since today the method used in the digital sector involves a line of processes and machines with an inlet at 90 degrees with respect to the start of the process in the laminar product feeder machine, making the work area impossible in a minimum area of approximately 120 $m^2$, preventing the possibility of installing other lines of machinery parallel to the digital line.

Moreover, the installation with sheet feeders at 90 degrees, or with a perpendicular inlet for laminar products, creates a series of blind spots which increase the risk of work-related accidents and reduce visibility of the machine in operation.

In order to clearly understand why these two types of printing processes are not unified in one single machine, it is necessary to disclose the operations of each of them, such that the main differences between these two types of feeder machines can be clearly seen.

In a feeder machine of an insertion device/station for the flexographic printing sector, the following basic elements or processes are incorporated:

- The feeding of the board is performed along the wider side of the sheet.
- A base whereon a stack of sheets to be treated rests.
- A lift module for lifting the stack of sheets to a certain height.
- An insertion module, incorporated into a gantry, responsible for separating the stack of sheets into smaller stacks with a certain height. The outlet area of the different stacks leads to the next internal process.
- A device for flipping the extracted and formed stack 180 degrees. It may or may not exist depending on the type of printing to be worked with, upper or lower.
- Belts for extracting/moving the stack to a station for squaring and scaling the stack of sheets, which may or may not exist depending on the level of automation.
- A transfer or movement element on a telescopic system, adjustable to the size of sheet being fed, which connects to the insertion device/station of the flexographic printing line.
- A device responsible for positioning, aligning and/or adjusting the incoming flow of sheets into the insertion device/station of the flexographic printing line, whether in small stacks or scaled.

Different manual/electronic devices responsible for the adjustment and flow of feeding sheets into the insertion device/station of the flexographic printing line responsible for activating the operations of the feeder machine as the stack of sheets on the insertion device/station is consumed.

In a feeder machine of an insertion device/station for the digital sector, the main differences are as follows:

The board is generally fed on the shorter side of the sheet.

The side to be printed is usually on the underside when the final product leaves the corrugator, with which it is necessary to flip the laminar product 180 degrees. Currently, the process is performed internally and on a mandatory basis.

The laminar product must rotate 90 degrees with respect to the forward axis for the subsequent insertion process, generally changing the side of the sheet to be worked on for the shorter side thereof, or depending on the features of the same sheet.

Currently, the process is carried out by means of a 90-degree transfer which is performed in on a mandatory basis, feeding the insertion device/station perpendicularly with respect to the forward direction of the feeder machine, an L-shaped transfer being necessary.

The insertion device can perform double feeding from/to the digital printer, i.e., it creates two simultaneous insertion modules, which must be continuously fed.

The stacks of sheets extracted with the insertion module can feed the insertion device in the double feeding mode thereof, but currently it is fed discontinuously for both single feeding and double feeding, and transversely to the forward direction of the feeder machine, with only one stack for each side per feeder machine cycle, not in unison and continuously, which can cause delays in the feeding of laminar material or even machine downtime due to a lack of laminar material.

The existence of the patent with international publication number WO 2017/203074 A1 is known, which includes a more detailed study of the situation of the sector and concern about the automation of systems for the digital printing sector, a patent which is characterised in that the feeding of the machine is perpendicular to the forward direction of the feeder machine, with mandatory transfers at 90 degrees and stack flipping at 180 degrees, also mandatory.

But the difference is based on the fact that the present invention tries to maintain the existing working model in the flexographic sector of cardboard, wherein the laminar product feeding machines for an insertion device/station are much more efficient in terms of space and in process, longitudinally aligned with the digital printer. This means there is practically no need to modify the existing facilities.

It also offers more versatility when rotating the extracted stack, since the rotation system may or may not work with rotations at 90 degrees, 180 degrees and 270 degrees. In addition to the flipping station, which can be internal or external.

Another very important feature is that the feed flow on the insertion device/station for the digital sector is continuous, both in single and double feeding, thereby preventing possible problems with supply and improving the general speed of the line.

The applicant is not aware of an invention that has all the features described below.

SUMMARY OF THE INVENTION

In order to achieve the objectives and avoid the aforementioned drawbacks, the present invention has been developed to improve the space, the process and the versatility of the machinery for feeding laminar product with the same features existing in the digital sector, constituting an innovation for the desired purpose.

The present invention describes a machine for feeding laminar product to an insertion device/station before a digital printer, which are aligned longitudinally, comprising a base whereon a stack of laminar products rests in a rectangular shape, generally with the longer side thereof perpendicular to the insertion device and stacked in an ordered manner among each other, a lift with the capacity to lift said base with the stack higher, an insertion system for separating the stack into groups of smaller stacks, a rotation system able to rotate said stacks 90 degrees, 180 degrees and 270 degrees with respect to the forward direction or not to work, a lift for facilitating the position of the first laminar product load, a station for squaring and scaling the stacks which can also act as a loading hopper thanks to the arrangement thereof on a lower level, and a dragging belt system or other telescopic transfer system for feeding the insertion device/station of the digital printing line.

The initial base is comprised of a fixed acetal band or a similar actuated mechanism (with or without a stack centering device), responsible for inserting the stack to be treated into the lifting system, a system to which the base is anchored.

The lift system is configured by a gantry comprising crossbars and support pillars, which by means of actuating the system, lifts the base in accordance with the predefined volume which is evacuated by means of the insertion system.

The insertion system extracts sheets ordered and arranged horizontally in height from the initial stack of product and into small ordered groups of this laminar product.

The 180-degree stack flipping system may or may not exist depending on whether the process is necessary or is previously performed outside the machine.

The rotation system at which the inserted stack arrives, where it may or may not rotate 90 degrees, 180 degrees and 270 degrees depending on the need of the work to be performed. The system is provided with movement at a height in order to facilitate the first loading of product. The rotation system may also be provided with two independently-actuated areas for the double feeding mode of an insertion device/station. This rotation system is provided with a system of stops comprising a platen which is located in a support structure that can be moved axially such that it positions the stacks conveniently for the positioning thereof.

The squaring and scaling station, positioned at another height level with respect to the rotation system and creating a loading hopper, wherein the stack arrives from the previous process, and wherein it is squared and scaled by means of mechanisms, front stops and lateral stops, preparing the material for the feeding thereof. This station comprises a system of front and lateral stops which can move axially and laterally, respectively, in order to adapt to the sheet formats.

The belt system or other telescopically-adjustable transportation system for adapting to the lengths of the sheets, by which the previously-scaled sheets are moved until they reach the insertion device/station of the digital printing line.

The machine may also allow stacks of cardboard with measurements greater than the ones built in the feeder machine to pass through the lift of the machine, in order to manually feed the insertion device/station for the digital sector.

Other features and advantages of the object of the present invention will become apparent from the description of a preferred, but not exclusive, embodiment, which is illustrated by way of non-limiting example in the accompanying drawings, wherein:

Below is a list of the references used in the figures:
1. Lifting system.
2. Insertion system.
3. Rotation system.
4. Positioning stop.
5. System for squaring and scaling the stacks.
6. Telescopically-adjustable transportation system.
7. Mechanism for extracting excess from the stack.
8. Lifting system of the rotation mechanism.
9. Insertion device.

DESCRIPTION OF THE INVENTION

In light of the aforementioned figures and, according to the numbering adopted, a preferred exemplary embodiment of the invention can be seen in them, which comprises the parts and elements indicated and described in detail below.

Figure 1:
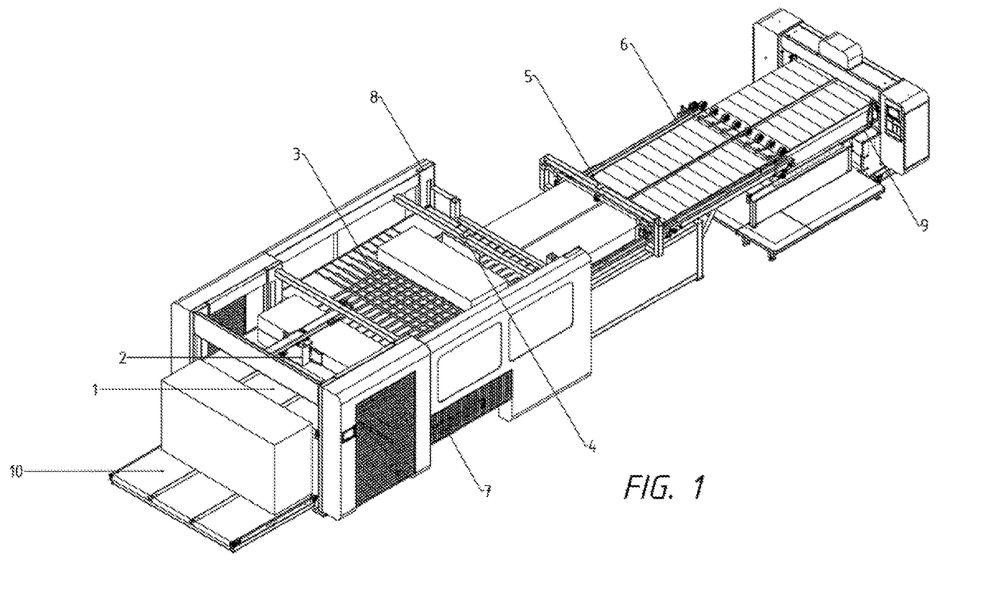
FIG. 1 represents a perspective view of the device of the invention for feeding products in sheets into a longitudinally-aligned insertion device.

As seen in FIG. 1, an embodiment of the station for feeding laminar elements is shown by way of example. This feeder station is linked to an insertion device, of a known type, for which reason more detail will not be given in the description thereof.

The feeder station comprises the following portions:

A receiving area wherein a stack of the laminar elements, each one arranged in the horizontal plane or parallel to the ground plane, is received on a base (10) and arrives by means of conveyor belts and is lifted by means of a lifting system (1) in order to be subsequently divided into groups at a lower height by means of an insertion system (2) in a subsequent rotation system.

An excess extraction mechanism (7) which is used when the maximum number of group divisions has been reached, which have a lower height and are inserted by means of the insertion system (2) that the latter can insert and which must be extracted from the conveyor belt in order to enable another stack to enter. This extraction mechanism (7) is made up of rollers and a mechanism which extracts the board from one side of the device.

A rotation system (3) which enables, when necessary, the extracted stack to be rotated.

When the width of the inserted laminar body is greater than the width of the insertion device (9) whereon the sheets are being fed, it must necessarily rotate in order to be able to be inserted into the insertion device (9).

If the width of the inserted stack is less than the maximum width of the insertion device (9), it can continue to move forward without needing to be rotated.

When the length of the inserted laminar body is less than half the maximum width of the insertion device (9), it is possible to work with two lines for inserting laminar material, e.g., the laminar element groups can be handled before entering the insertion device (9) such that they form two rows, as shown in a general view in FIG. 1, wherein this system is represented.

It should be mentioned that the rotation system (3) is provided with a system of stops (4) comprising a platen which is located in a support structure that can be moved axially such that it positions the stacks conveniently for the positioning thereof, both for feeding with one row or two rows.

The rotation system (3) is provided with a lifting system (8), necessary to be suitably arranged on the following system in order to make the transfer to the same as needed.

A system for squaring and scaling the stacks (5), wherein the stack (single or double) is suitably positioned for the feeding thereof to the insertion device (9). This system is foreseen with a scaling stop for distributing the laminar elements individually inside the insertion device (9). In this manner, gradual loading is performed in the feeding area of the insertion device (9). This squaring system (5) can be used as an accumulating hopper for continuous feeding without interruption in the row, if considered necessary, taking advantage of the lifting system (8) in the previous transfer.

A belt system or other telescopically-adjustable transportation system (6) for adapting to the lengths of the sheets, by which the previously-scaled sheets are moved until they reach the insertion device/station of the digital printing line.

The method of operating the feeder station for a group of elements described previously is detailed below.

Figure 2:
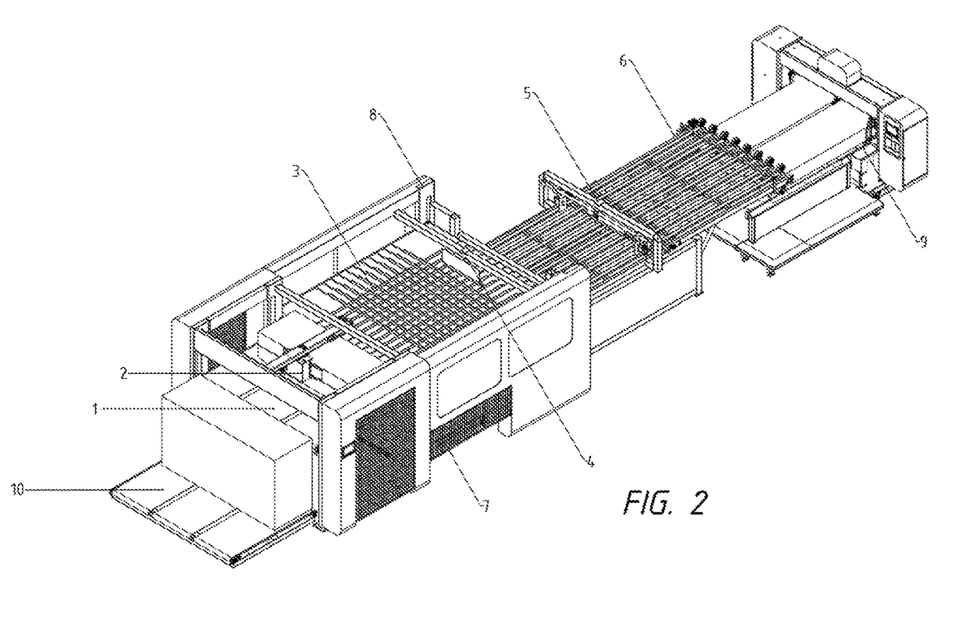
FIG. 2 represents a perspective view of the initial state.

First, as shown in FIG. 2, a stack of laminar elements arranged horizontally is inserted, the longitudinal axis of which will generally be perpendicular to the forward direction of the line, and it is lifted to an insertion system (2) which inserts a stack with a lower height.

If the rotation is not necessary due to the above mentioned, the extracted stack would continue the transfer thereof by going from the rotation system (3) to the squaring and scaling system (5). The case described in the figures is the case of double row feeding, which means that the extracted stack would be rotated.

Figure 3:
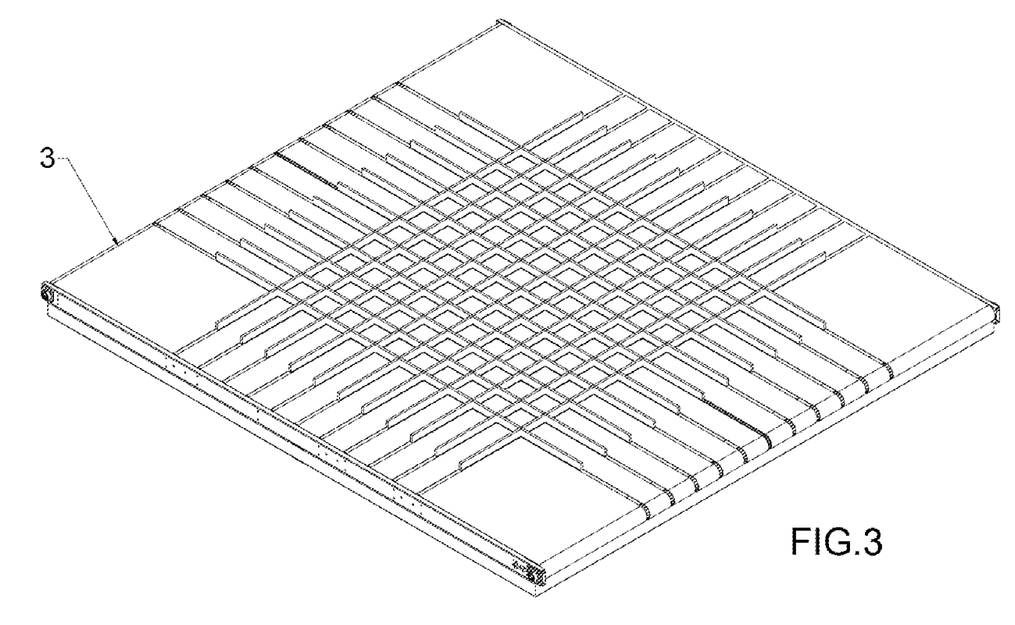
FIG. 3 represents a detail view of a system for 90, 180, 270-degree rotation which makes up part of the device of the invention.

FIG. 3 shows a diagram of a possible rotation system (3), wherein a pallet of platens, crossed with each other, is embedded and hidden under the level of the conveyor belt, rising and rotating when it is necessary to reposition the stacks.

Figure 4:
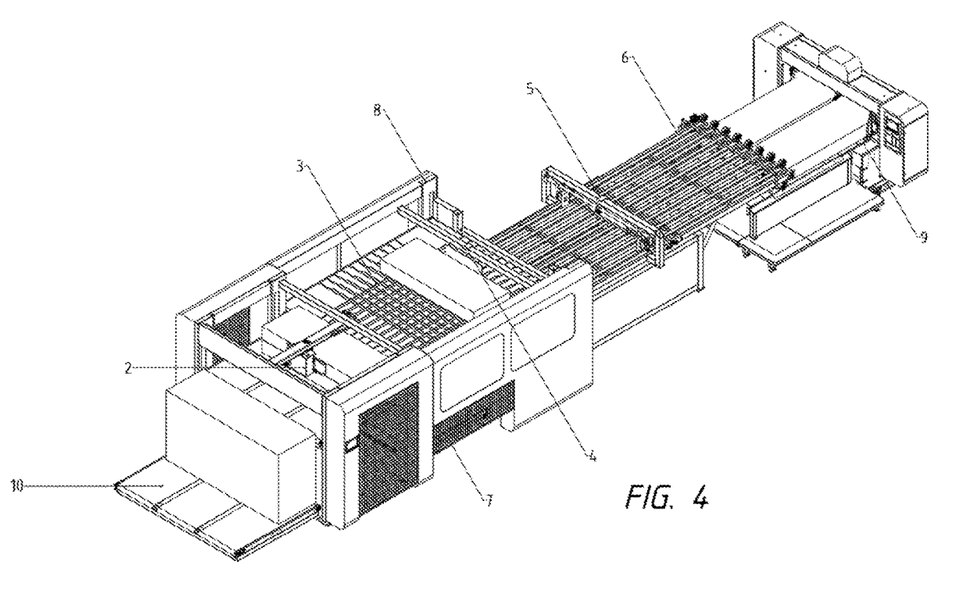
FIG. 4 represents a perspective view of the inlet of the first package to the rotation system for double feeding in the insertion device for laminar parts.
Figure 5:
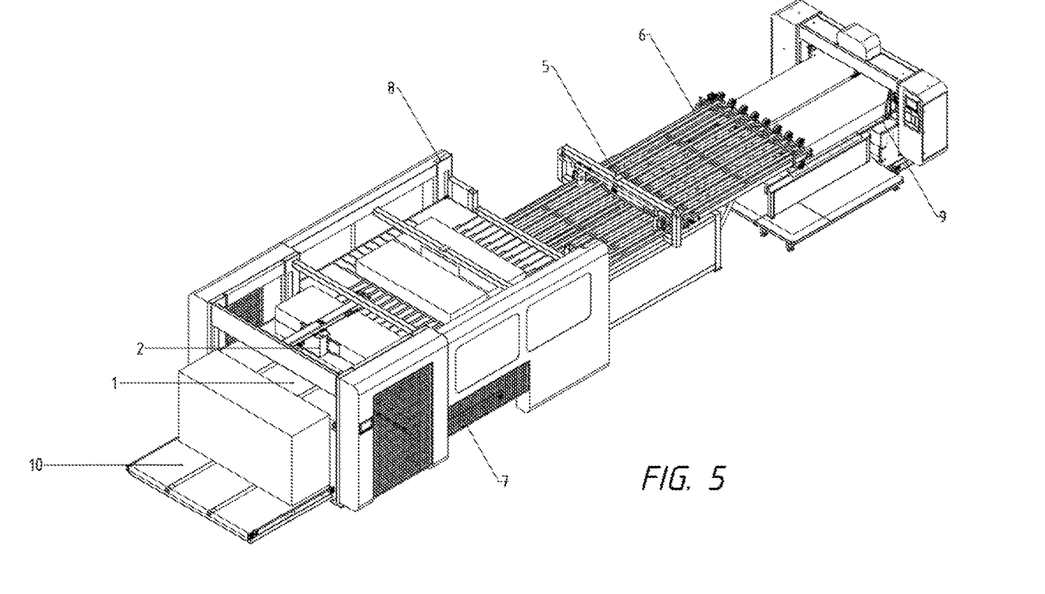
FIGS. 5 and 6 represent perspective views of the progression of a 90-degree rotation.

Therefore, as shown in FIG. 4, the stack extracted and pushed by the insertion device (2) reaches the stop (4) and is positioned. As in the case of double row feeding, a second extracted stack will arrive and will be positioned once again by means of the stop (4) which has been moved to the necessary position as shown in FIG. 5.

Figure 6:
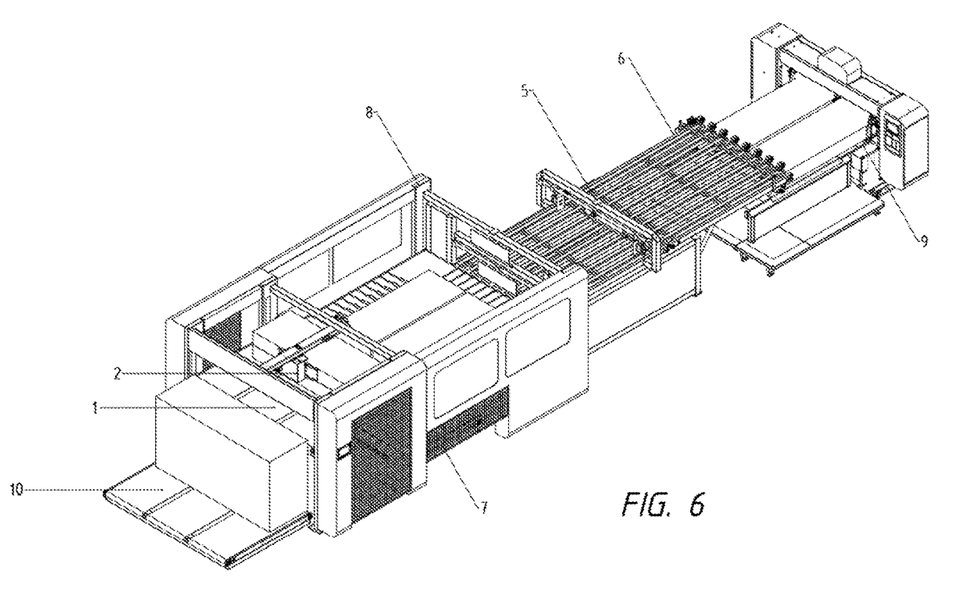

Then, as shown in FIG. 6, once the two smaller stacks are positioned, the stop (4) is withdrawn and the stacks can then be rotated in order to situate the longitudinal axis of the product parallel to the forward direction.

Figure 7:
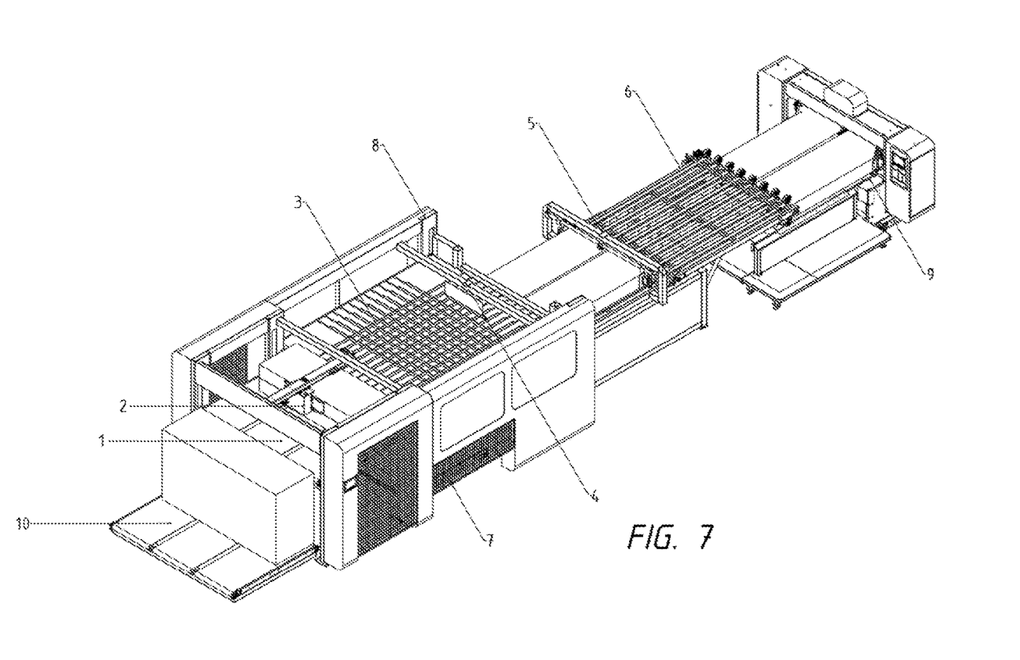
FIGS. 7 and 8 represent perspective views of the progression of the feed flow for double feeding of laminar parts.

Subsequently, as seen in FIG. 7, the stacks are transferred to the squaring and scaling system (5), wherein they are correctly positioned for the subsequent insertion thereof. At this time, the rotation system is already available for the insertion of new product.

Figure 8:
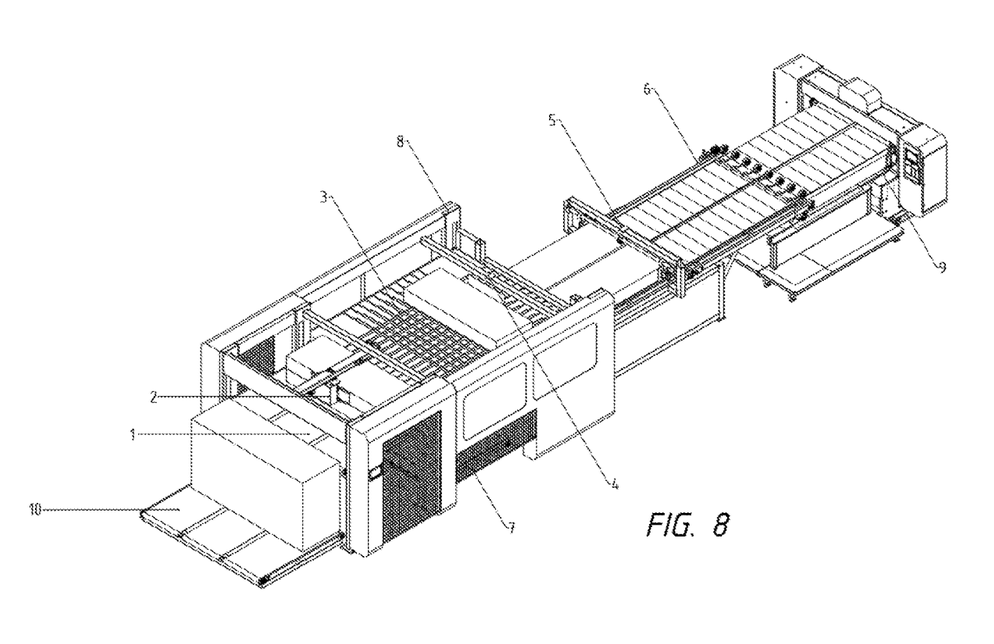

Finally, in FIG. 8, it may be seen how the laminar elements leave the scaling system (5) distributed individually inside the insertion device (9), being moved through a telescopically-adjustable transportation system (6) by belts.

The invention claimed is:

1. A device for feeding products in sheets into an insertion device before a digital printer comprising:
    a base configured to receive a stack of laminar elements, stacked vertically and ordered among each other, wherein the base is positioned anchored on a lifting system comprising:
    an insertion system configured to enable the stack of laminar elements structured vertically and ordered among each other to be separated into groups with a known size,
    a rotation system with the capacity to rotate the stack an angle to be selected between 90 degrees, 180 degrees and 270 degrees,
    a positioning stop configured to correctly position the stack, which is the process before rotating, in the direction longitudinal to the digital printer,
    a squaring and scaling station, wherein the stack arrives from a previous process, and the squaring and scaling station is configured to square and scale the stack, and
    a telescopically-adjustable transportation system configured to move the previously-scaled stack until the insertion device is fed;
    wherein,
    the lifting system is configured to vertically move a stack of sheets, and
    the insertion system is configured to provide ordered stack groups from the original stack.

2. The device for feeding products in sheets, according to claim 1, wherein the device for feeding products in sheets is longitudinally aligned with the insertion device before the digital printer.

3. The device for feeding products in sheets, according to claim 1, wherein the rotation system has a capacity to rotate two stacks positioned perpendicularly to each other with respect to a forward direction of the device for feeding products in sheets, such that the rotation system enables double feeding of the laminar elements, in parallel and longitudinally aligned with the insertion device.

4. The device for feeding products in sheets, according to claim 1, wherein the station for squaring and scaling the stack further comprises a capacity to create a loading hopper in order to continuously feed laminar elements, or to allow the complete stack to pass for discontinuous feeding.

5. The device for feeding products in sheets, according to claim 1, further comprising a system for flipping the stack 180 degrees with respect to the forward direction of the device for feeding products in sheets.

6. The device for feeding products in sheets, according to claim 1, wherein the rotation system is variable in height.

* * * * *